United States Patent
Suzuki et al.

[19]

[11] Patent Number: 6,106,469
[45] Date of Patent: Aug. 22, 2000

[54] METHOD AND APPARATUS FOR REDUCING UNDESIRED MULTIPLE-ECHO SIGNAL IN ULTRASOUND IMAGING

[75] Inventors: Takao Suzuki; Hisashi Hagiwara, both of Yokohama; Hiroshi Fukukita, Tokyo, all of Japan

[73] Assignee: Matsushita Electric Industrial Co., Ltd., Osaka, Japan

[21] Appl. No.: 09/299,002

[22] Filed: Apr. 26, 1999

[30] Foreign Application Priority Data

Sep. 30, 1998 [JP] Japan ................................. 10-291353

[51] Int. Cl.[7] ........................................................ A61B 8/00
[52] U.S. Cl. ............................................. 600/443; 600/447
[58] Field of Search .................................... 600/437, 443, 600/447, 454; 73/626, 625; 367/7, 11, 103, 105

[56] References Cited

U.S. PATENT DOCUMENTS

| | | | |
|---|---|---|---|
| 3,778,757 | 12/1973 | Houston | 340/5 MP |
| 5,653,235 | 8/1997 | Teo | 600/447 |
| 5,664,572 | 9/1997 | Kishimoto | 600/443 |
| 5,776,066 | 7/1998 | Nock et al. | 600/443 |
| 5,891,038 | 4/1999 | Seyed-Bolorforosh et al. | 600/447 |
| 5,908,390 | 6/1999 | Matsushima | 600/447 |
| 5,961,461 | 10/1999 | Mo et al. | 600/443 |

FOREIGN PATENT DOCUMENTS

| | | |
|---|---|---|
| 6-181923 | 7/1994 | Japan . |
| 7-178081 | 7/1995 | Japan . |

*Primary Examiner*—Marvin M. Lateef
*Assistant Examiner*—Ali M. Imam
*Attorney, Agent, or Firm*—Louis Woo

[57] ABSTRACT

First 1-sound-line received signals are successively generated from an output signal of a transducer. One is selected from among the generated first 1-sound-line received signals as a 1-sound-line received signal of interest. Second 1-sound-line received signals are selected from among the generated first 1-sound-line received signals. The second 1-sound-line received signals include a 1-sound-line received signal preceding the 1-sound-line received signal of interest and also a 1-sound-line received signal following the 1-sound-line received signal of interest. The second 1-sound-line received signals are averaged into a mean 1-sound-line received signal which corresponds to an undesired multiple-echo signal. The mean 1-sound-line received signal is subtracted from the 1-sound-line received signal of interest to remove the undesired multiple-echo signal from the 1-sound-line received signal of interest.

11 Claims, 6 Drawing Sheets

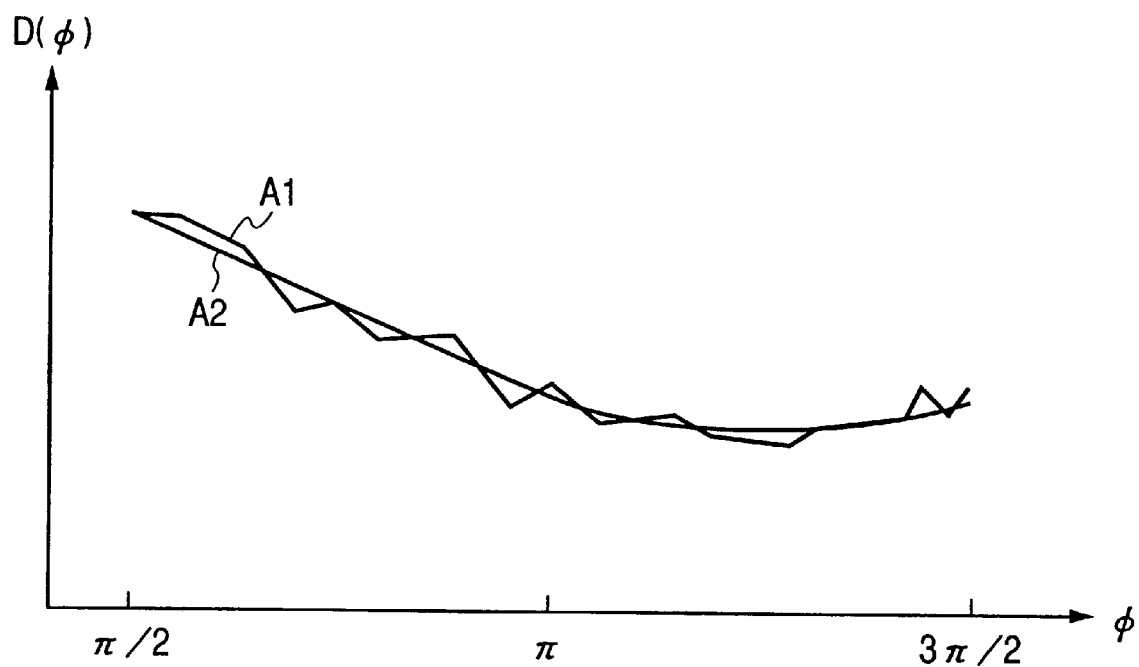

6,106,469

METHOD AND APPARATUS FOR REDUCING UNDESIRED MULTIPLE-ECHO SIGNAL IN ULTRASOUND IMAGING

BACKGROUND OF THE INVENTION

1. Field of the Invention

This invention relates to a method of reducing an undesired multiple-echo signal in ultrasound imaging. This invention also relates to an apparatus for reducing an undesired multiple-echo signal in ultrasound imaging.

2. Description of the Related Art

A general ultrasound imaging apparatus includes a probe for emitting an ultrasound beam into a body to be examined. The probe also receives ultrasound echoes from the body.

A typical ultrasound probe of a mechanical scan type includes a transducer, a rotor, and an acoustic window. The transducer is mounted on the rotor. The transducer moves together with the rotor. The acoustic window forms a part of a probe casing in which the rotor and the transducer are disposed. The combination of the rotor and the transducer is spaced from the acoustic window. The probe contains ultrasound propagation medium or liquid which fills a space between the acoustic window and the combination of the rotor and the transducer. The transducer emits an ultrasound beam. The ultrasound beam travels through the propagation liquid and the acoustic window before entering a body to be examined. The transducer receives ultrasound echoes from the body via the acoustic window and the propagation liquid. As the rotor rotates, the direction of the travel of the ultrasound beam emitted from the probe moves so that the body is scanned by the ultrasound beam.

In the typical ultrasound probe, a portion of the ultrasound beam tends to travel between the acoustic window and the transducer while being periodically reflected at the surfaces thereof. Such a phenomenon causes undesired multiple echoes which result in artifact in imaging.

Japanese published unexamined patent application 6-181923 discloses an ultrasound imaging apparatus designed to reduce or weaken a multiple-reflection-caused artifact image. In the apparatus of Japanese application 6-181923, a probe has a heater and a cooler for ultrasound propagation medium therein. In addition, an artifact image is observed via a display. The heater and the cooler are controlled to minimize the intensity of the artifact image indicated on the display. The control of the heater and the cooler adjusts the temperature of the propagation medium, thereby matching the acoustic impedance of the propagation medium and the acoustic impedance of a body to be examined. The heater and the cooler causes a complicated structure of the probe.

Japanese published unexamined patent application 7-178081 discloses an ultrasound imaging apparatus including a received signal processor designed to reduce or weaken multiple-reflection-caused artifact. The received signal processor in Japanese application 7-178081 has a memory previously loaded with an undesired multiple-echo signal. During operation of the apparatus, the received signal processor subtracts the undesired multiple-echo signal from a received signal to remove multiple-reflection-caused artifact. The apparatus of Japanese application 7-178081 requires a process of preliminarily generating an undesired multiple-echo signal, and a process of storing the generated undesired multiple-echo signal into the memory. Such processes tend to be troublesome.

SUMMARY OF THE INVENTION

It is a first object of this invention to provide an improved method of reducing an undesired multiple-echo signal in ultrasound imaging.

It is a second object of this invention to provide an improved apparatus for reducing an undesired multiple-echo signal in ultrasound imaging.

A first aspect of this invention provides a method of reducing an undesired multiple-echo signal in ultrasound imaging. The method comprises the steps of successively generating first 1-sound-line received signals from an output signal of a transducer; selecting one from among the generated first 1-sound-line received signals as a 1-sound-line received signal of interest; selecting second 1-sound-line received signals from among the generated first 1-sound-line received signals, the second 1-sound-line received signals including a 1-sound-line received signal preceding the 1-sound-line received signal of interest and also a 1-sound-line received signal following the 1-sound-line received signal of interest; averaging the second 1-sound-line received signals into a mean 1-sound-line received signal which corresponds to an undesired multiple-echo signal; subtracting the mean 1-sound-line received signal from the 1-sound-line received signal of interest to remove the undesired multiple-echo signal from the 1-sound-line received signal of interest.

A second aspect of this invention is based on the first aspect thereof, and provides a method further comprising the step of using a probe of a mechanical scan type in which the transducer is provided.

A third aspect of this invention provides a method of reducing an undesired multiple-echo signal in ultrasound imaging. The method comprises the steps of generating information of a distance between a movable transducer and an acoustic window in a probe, the distance depending on a position of the transducer; successively generating first 1-sound-line received signals from an output signal of the transducer; selecting one from among the generated first 1-sound-line received signals as a 1-sound-line received signal of interest; selecting second 1-sound-line received signals from among the generated first 1-sound-line received signals, the second 1-sound-line received signals including a 1-sound-line received signal preceding the 1-sound-line received signal of interest and also a 1-sound-line received signal following the 1-sound-line received signal of interest; delaying the second 1-sound-line received signals into third 1-sound-line received signals in response to the information of the distance; averaging the third 1-sound-line received signals into a mean 1-sound-line received signal which corresponds to an undesired multiple-echo signal; subtracting the mean 1-sound-line received signal from the 1-sound-line received signal of interest to remove the undesired multiple-echo signal from the 1-sound-line received signal of interest.

A fourth aspect of this invention is based on the third aspect thereof, and provides a method wherein the delaying step comprises delaying the second 1-sound-line received signals by amounts depending on a number of times of ultrasound reflections which cause an undesired multiple-echo signal to be removed.

A fifth aspect of this invention provides an apparatus for reducing an undesired multiple-echo signal in ultrasound imaging.

The apparatus comprises a transducer; means for successively generating first 1-sound-line received signals from an output signal of the transducer; means for selecting one from among the generated first 1-sound-line received signals as a 1-sound-line received signal of interest; means for selecting second 1-sound-line received signals from among the generated first 1-sound-line received signals, the second 1-sound-line received signals including a 1-sound-line received signal preceding the 1-sound-line received signal of interest and also a 1-sound-line received signal following proceeding the 1-sound-line received signal of interest; means for averaging the second 1-sound-line received signals into a mean 1-sound-line received signal which corresponds to an undesired multiple-echo signal; means for subtracting the mean 1-sound-line received signal from the 1-sound-line received signal of interest to remove the undesired multiple-echo signal from the 1-sound-line received signal of interest.

A sixth aspect of this invention is based on the fifth aspect thereof, and provides an apparatus further comprising a probe of a mechanical scan type in which the transducer is provided.

A seventh aspect of this invention provides an apparatus for reducing an undesired multiple-echo signal in ultrasound imaging. The apparatus comprises a probe including a movable transducer and an acoustic window; means for generating information of a distance between the transducer and the acoustic window, the distance depending on a position of the transducer; means for successively generating first 1-sound-line received signals from an output signal of the transducer; means for selecting one from among the generated first 1-sound-line received signals as a 1-sound-line received signal of interest; means for selecting second 1-sound-line received signals from among the generated first 1-sound-line received signals, the second 1-sound-line received signals including a 1-sound-line received signal preceding the 1-sound-line received signal of interest and also a 1-sound-line received signal following the 1-sound-line received signal of interest; means for delaying the second 1-sound-line received signals into third 1-sound-line received signals in response to the information of the distance; means for averaging the third 1-sound-line received signals into a mean 1-sound-line received signal which corresponds to an undesired multiple-echo signal; means for subtracting the mean 1-sound-line received signal from the 1-sound-line received signal of interest to remove the undesired multiple-echo signal from the 1-sound-line received signal of interest.

An eighth aspect of this invention is based on the seventh aspect thereof, and provides an apparatus wherein the delaying means comprises means for delaying the second 1-sound-line received signals by amounts depending on a number of times of ultrasound reflections which cause an undesired multiple-echo signal to be removed.

A ninth aspect of this invention is based on the seventh aspect thereof, and provides an apparatus wherein the information generating means comprises means for generating the information of the distance in response to a portion of the output signal of the transducer which represents a first reflected wave caused by and coming from the acoustic window.

A tenth aspect of this invention is based on the seventh aspect thereof, and provides an apparatus wherein the information generating means comprises means for detecting every moment at which an amplitude of the output signal of the transducer exceeds a predetermined reference value, and means for generating the information of the distance in response to the detected moment.

An eleventh aspect of this invention is based on the seventh aspect thereof, and provides an apparatus wherein the information generating means comprises means for generating the information of the distance according to an approximate trigonometric function.

BRIEF DESCRIPTION OF THE DRAWINGS

FIG. 7 is a diagram of relations between an angular position $\phi$ of a rotor and a spatial interval $D(\phi)$ between a transducer and an acoustic window which occur in the second embodiment and a third embodiment of this invention.

DESCRIPTION OF THE PREFERRED EMBODIMENTS

First Embodiment

Figure 1:
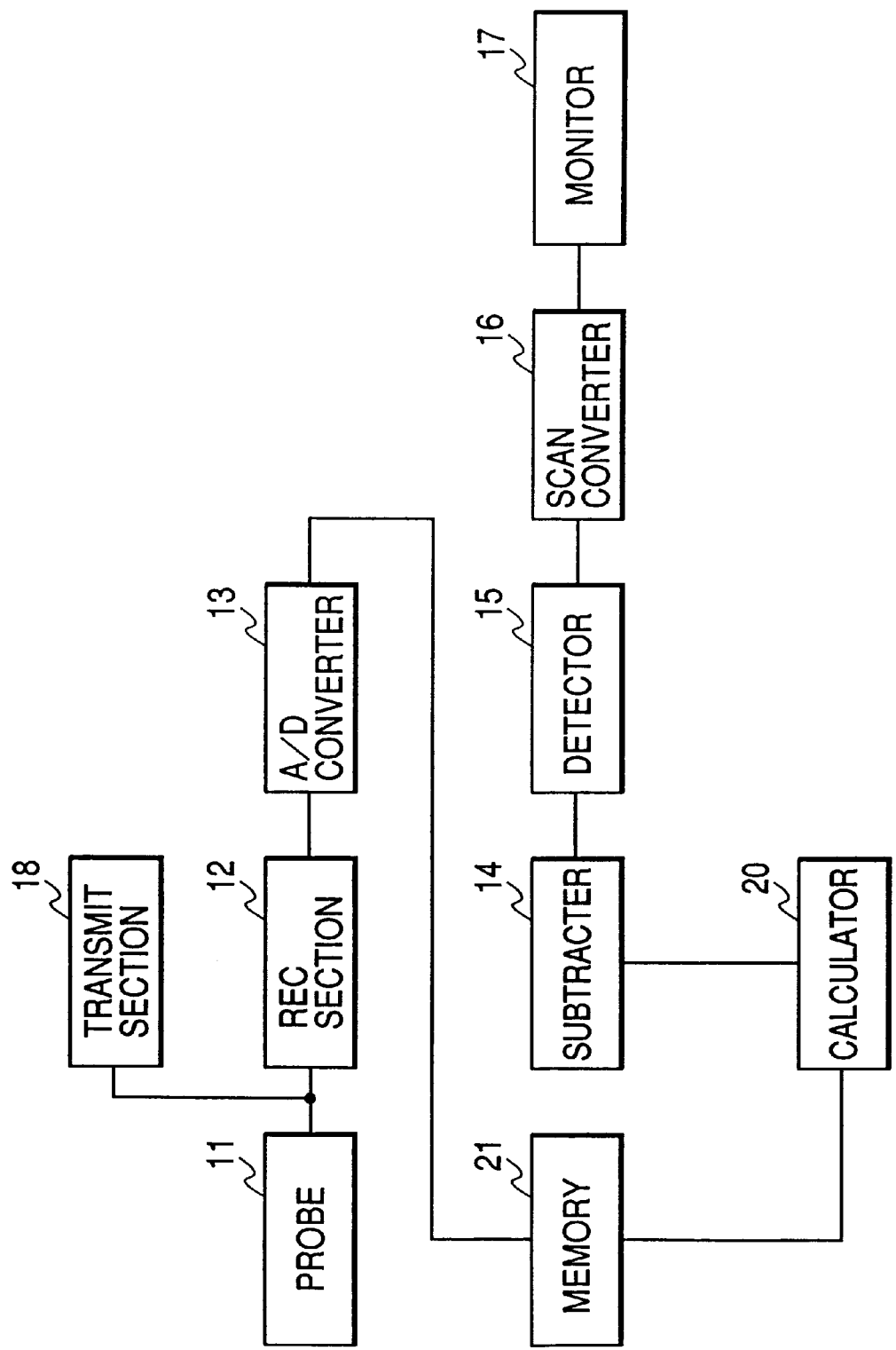
FIG. 1 is a block diagram of an ultrasound imaging system according to a first embodiment of this invention.

FIG. 1 shows an ultrasound imaging system according to a first embodiment of this invention. The ultrasound imaging system of FIG. 1 includes a probe 11 a receiving section 12 an A/D converter 13 a subtracter 14 a detector 15 a scan converter 16 a monitor 17 a transmitting section 18 a calculator 20 and a memory 21.

The transmitting section 18 and the receiving section 12 are connected to the probe 11. The receiving section 12 is successively followed by the A/D converter 13 and the memory 21. The subtracter 14 is connected to the calculator 20 and the memory 21. The calculator 20 is connected to the memory 21. The subtracter 14 is successively followed by the detector 15 the scan converter 16, and the monitor 17.

The transmitting section 18 generates an electric drive pulse signal for the probe 11. The transmitting section 18 feeds the electric drive pulse signal to the probe 11. The probe 11 converts the electric drive pulse signal into a beam of corresponding ultrasound pulses, and emits the ultrasound pulse beam into a body to be examined.

The emitted ultrasound pulse beam is reflected at various places within the body. The reflection-resultant ultrasound pulse beams are ultrasound echo beams. Portions of the ultrasound echo beams return to the probe 11. The probe 11 converts the received portions of the ultrasound echo beams into a corresponding electric echo signal which is also referred to as an electric received signal. The probe 11 outputs the electric received signal to the receiving section 12.

For example, the ultrasound transmission by the probe 11 and the ultrasound reception by the probe 11 are alternately and periodically implemented on a time sharing basis.

Figure 2:
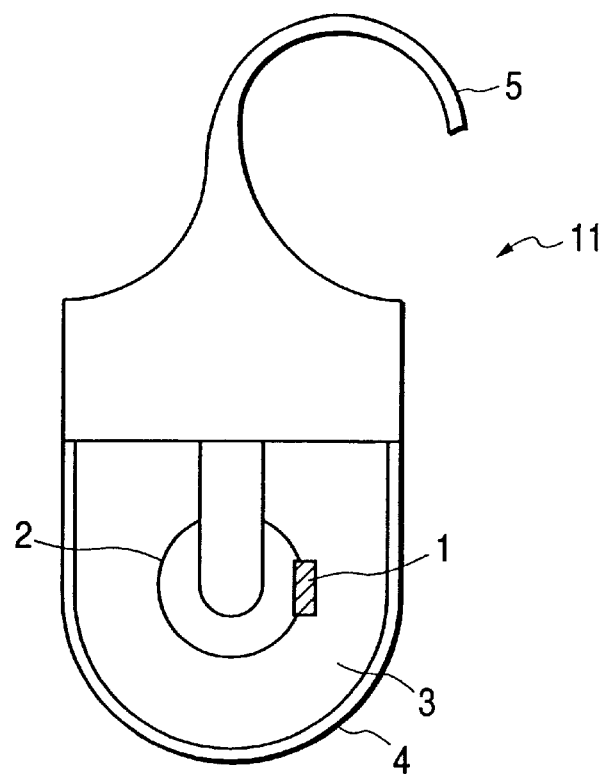
FIG. 2 is a sectional diagram of a probe in FIG. 1.

As shown in FIG. 2, the probe 11 includes a transducer 1 a rotor 2 ultrasound propagation medium or liquid 3 and an acoustic window 4. The probe 11 has a casing in which the transducer 1 the rotor 2 and the propagation liquid 3 are contained. The transducer 1 is mounted on the rotor 2. The rotor 2 is rotated by a motor (not shown) in the probe 11. The transducer 1 rotates in accordance with rotation of the rotor 2. The transducer 1 includes, for example, a piezoelectric element array. The acoustic window 4 forms a part of the casing. The combination of the transducer 1 and the rotor 2 is separated from the acoustic window 4. A space between the transducer 1 and the acoustic window 4 is filled with the propagation liquid 3. The acoustic window 4 is hemispherical. The center of the hemisphere of the acoustic window 4 coincides with the center of rotation of the rotor 2 that is, the center of rotation of the transducer 1. The transducer 1 in the probe 11 is electrically connected to the receiving section 12 and the transmitting section 18 (see FIG. 1) via a cable 5.

The probe 11 is applied to a body to be examined. The transducer 1 receives the electric drive pulse signal from the transmitting section 18. The transducer 1 converts the electric drive pulse signal into a beam of corresponding ultrasound pulses. The transducer 1 emits the ultrasound pulse beam. The ultrasound pulse beam emitted from the transducer 1 passes through the propagation liquid 3 and the acoustic window 4 before entering the body to be examined. The emitted ultrasound pulse beam is reflected at various places within the body. The reflection-resultant ultrasound pulse beams are ultrasound echo beams. Portions of the ultrasound echo beams return to the transducer 1 via the acoustic window 4 and the propagation liquid 3. The transducer 1 converts the received portions of the ultrasound echo beams into a corresponding electric echo signal which is also referred to as an electric received signal. The transducer 1 outputs the electric received signal to the receiving section 12. As the rotor 2 rotates, the direction of the travel of the ultrasound pulse beam emitted from the transducer 1 moves so that the body is scanned by the ultrasound pulse beam. A given number of unit scanning processes by the transducer 1 provides a 1-frame sectional image of the body. The electric received signal generated for every unit scanning process is referred to as a 1-sound-line received signal or a 1-line received signal.

The receiving section 12 amplifies the electric received signal, and outputs the amplification-resultant received signal to the A/D converter 13. The A/D converter 13 changes the output signal of the receiving section 12 into a corresponding digital received signal. The A/D converter 13 outputs the digital received signal to the memory 21. The digital received signal is stored into the memory 21 line by line. A predetermined number of successive 1-line received signals are held in the memory 21. In the case where the memory 21 is fully occupied, each time the newest 1-line received signal is written into the memory 21 the oldest 1-line received signal is erased therefrom. The calculator 20 computes a mean of the 1-line received signals in the memory 21 and thereby generates the resultant mean 1-line received signal. The calculator 20 outputs the mean 1-line received signal to the subtracter 14. One is selected from among the 1-line received signals in the memory 21 as a 1-line received signal of interest. Preferably, the 1-line received signal in the middle of the temporal order is selected. The 1-line received signal of interest is fed from the memory 21 to the subtracter 14. The device 14 subtracts the mean 1-line received signal from the 1-line received signal of interest. The subtracter 14 outputs the subtraction-resultant signal to the detector 15. The detector 15 subjects the output signal of the subtracter 14 to a detection process, and thereby converts the output signal of the subtracter 14 into a first video signal. The detector 15 outputs the first video signal to the scan converter 16. The scan converter 16 collects every 1-frame amount of the first video signal. For every 1-frame, the scan converter 16 subjects the first video signal to scan conversion, and thereby changes the first video signal into a second video signal having a scan format suited for indication on the monitor 17. The scan converter 16 outputs the second video signal to the monitor 17. The monitor 17 indicates a sectional image of the body which is represented by the output signal of the scan converter 16.

During a 1-frame time interval except an initial stage, (2n+1) successive 1-line received signals are held in the memory 21. Here "n" denotes a predetermined natural number. In the probe 11 a portion of the ultrasound pulse beam tends to travel between transducer 1 and the acoustic window 4 while being periodically reflected at the surfaces thereof. Such a phenomenon causes undesired multiple echoes which would result in artifact in imaging. In each of the 1-line received signals in the memory 21 an undesired multiple-echo signal is superimposed on a desired echo signal caused by ultrasound reflections at places within the body.

Figure 3:
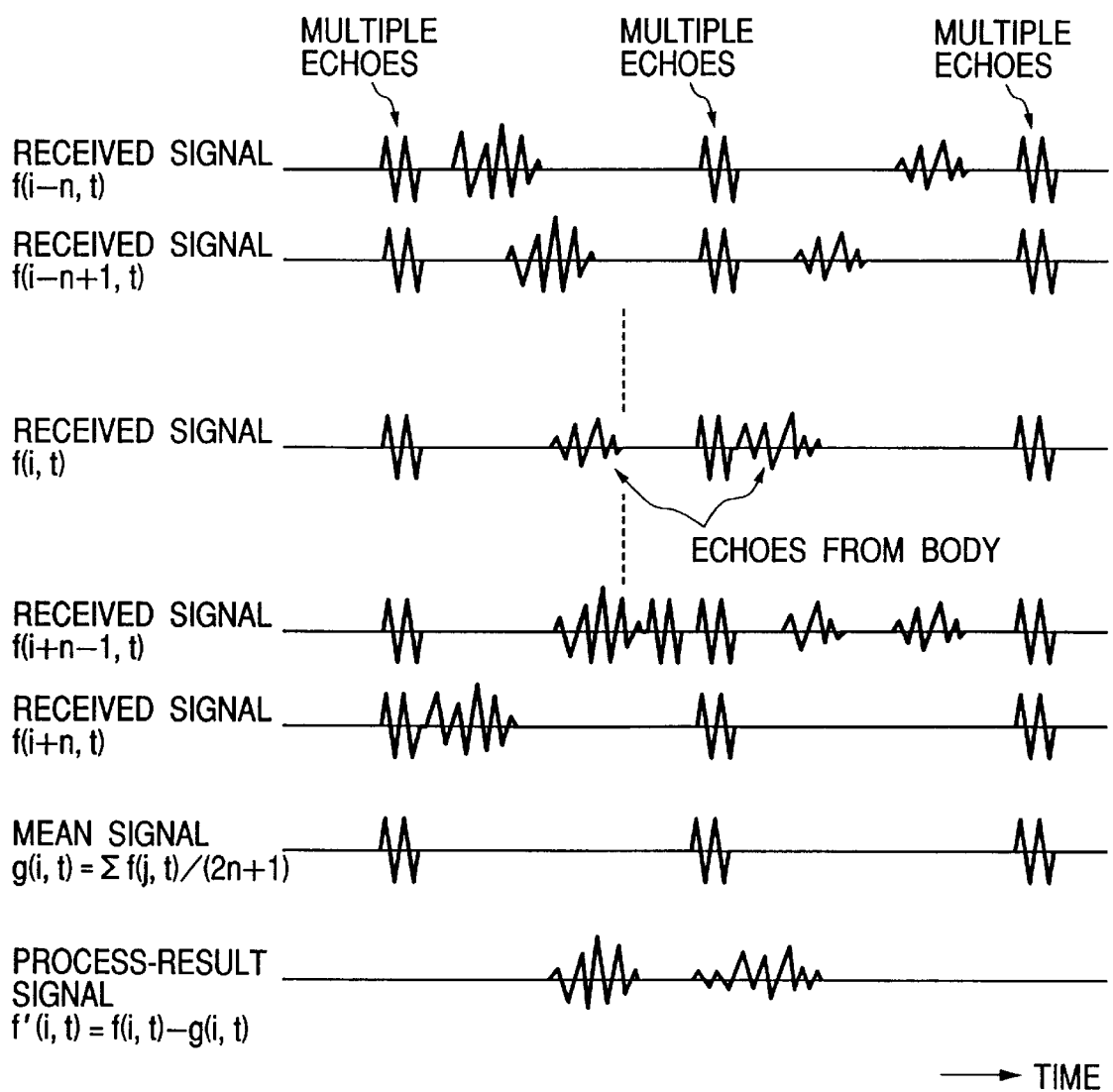
FIG. 3 is a time-domain diagram of waveforms represented by various signals which occur in the ultrasound imaging system of FIG. 1.

Now, the (2n+1) successive 1-line received signals in the memory 21 which occur at a moment "t" are denoted by f(i−n, t), f((i−n+1, t), ... , f(i, t), ... , f(i+n−1t), f(i+n, t), respectively. FIG. 3 shows an example of analog waveforms represented by the 1-line received signals f(i−n, t), f((i−n+1, t), ... , f(i, t), ... , f(i+n−1t), f(i+n, t). The calculator 20 computes a mean of the 1-line received signals in the memory 21 and thereby generates the resultant mean 1-line received signal g(i, t) according to an equation as follows.

$$g(i, t) = \{\Sigma f(j, t)\}/(2n+1)$$

The calculator 20 outputs the mean 1-line received signal g(i, t) to the subtracter 14. The middle 1-line received signal f(i, t) is selected from among the 1-line received signals in the memory 21 as a 1-line received signal of interest. The 1-line received signal f(i, t) of interest is fed from the memory 21 to the subtracter 14. The device 14 subtracts the mean 1-line received signal g(i, t) from the 1-line received signal f(i, t) of interest. The subtracter 14 outputs the subtraction-resultant signal f(i, t) to the detector 15.

With reference to FIG. 3, since the center of rotation of the transducer 1 (that is, the center of rotation of the rotor 2) coincides with the center of the hemisphere of the acoustic window 4 undesired multiple-echo components appear at equal temporal positions in the 1-line received signals f(i−n, t), f((i−n+1, t), ... , f(i, t), ... , f(i+n−1t), f(i+n, t). On the other hand, temporal positions of desired echo components in the 1-line received signals vary from line to line. Therefore, the mean 1-line received signal g(i, t) generated by the calculator 20 substantially has only the undesired multiple-echo components. In addition, the subtraction-resultant signal f(i, t) generated by the subtracter 14 is substantially free from the undesired multiple-echo components. Thus, the substraction-resultant signal f(i, t) substantially has only the desired echo components. In this way, the subtracter 14 removes the undesired multiple-echo components from the signal fed to the detector 15. The removal of the undesired multiple-echo components prevents the occurrence of artifact in imaging.

Second Embodiment

Figure 4:
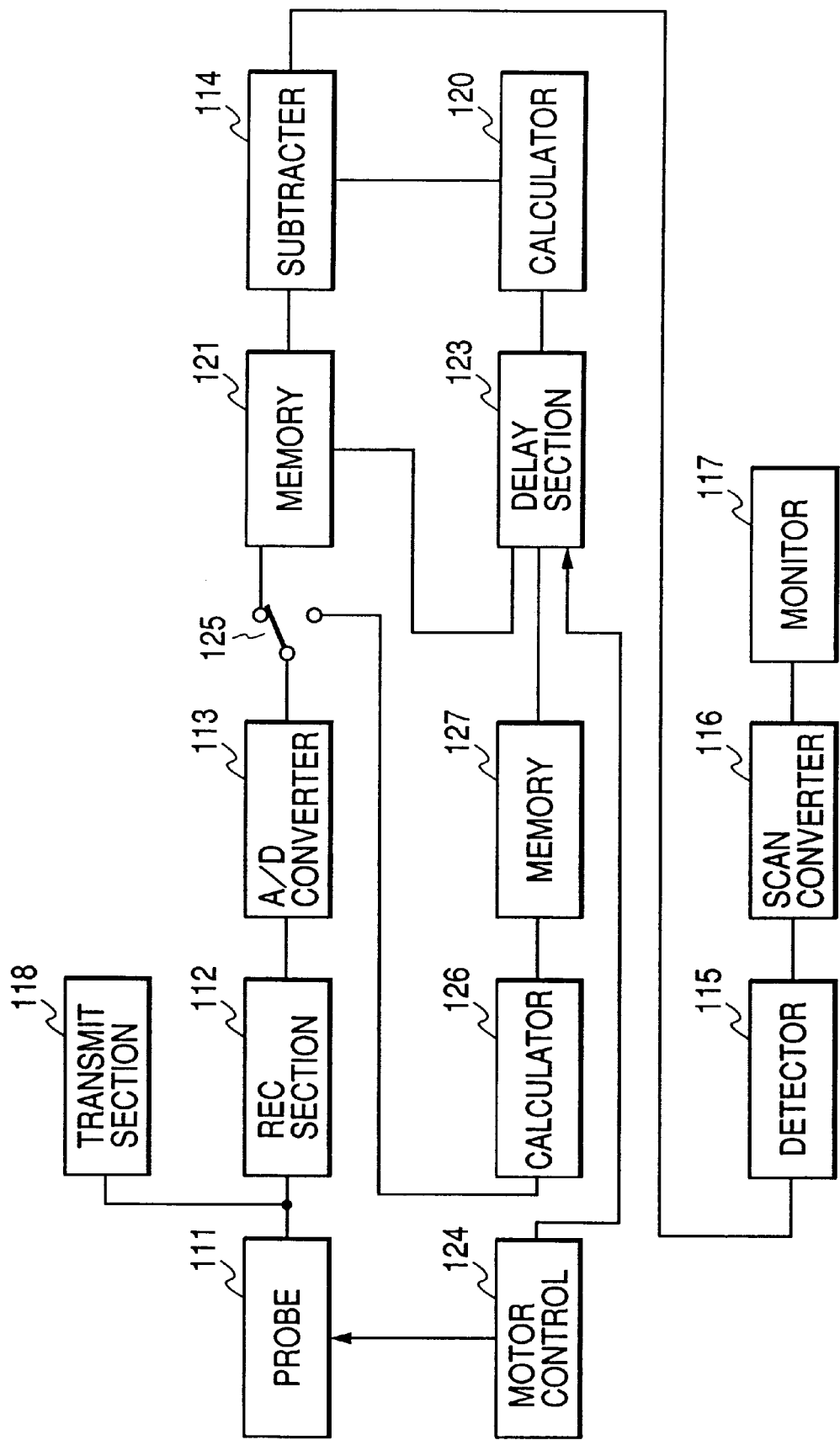
FIG. 4 is a block diagram of an ultrasound imaging system according to a second embodiment of this invention.

FIG. 4 shows an ultrasound imaging system according to a second embodiment of this invention. The ultrasound imaging system of FIG. 4 includes a probe 111 a receiving section 112 an A/D converter 113 a subtracter 114 a detector 115 a scan converter 116 a monitor 117 a transmitting section 118 a calculator 120 a memory 121 a delay section 123 a motor controller 124 a switch 125 a calculator 126 and a memory 127.

The transmitting section 118 and the receiving section 112 are connected to the probe 111. The receiving section 112 is successively followed by the A/D converter 113 the switch 125 and the memory 121. The subtracter 114 is connected to the calculator 120 and the memory 121. The calculator 120 is connected to the memory 121 via the delay section 123. The subtracter 114 is successively followed by the detector 115 the scan converter 116 and the monitor 117. The calculator 126 is connected to the A/D converter 113 via the switch 125. The memory 127 is connected between the calculator 126 and the delay section 123. The delay section 123 is connected to the calculator 120 and the memory 121. The motor controller 124 is connected to the probe 111 and the delay section 123.

The switch 125 connects the A/D converter 113 to either the memory 121 or the calculator 126. During a normal mode of operation of the system, the switch 125 connects the A/D converter 113 to the memory 121. During a preliminary mode of operation of the system which precedes the normal mode of operation thereof, the switch 125 connects the A/D converter 113 to the calculator 126.

The transmitting section 118 generates an electric drive pulse signal for the probe 111. The transmitting section 118 feeds the electric drive pulse signal to the probe 111. The probe 111 converts the electric drive pulse signal into a beam of corresponding ultrasound pulses. During the normal mode of operation of the system, the probe 111 emits the ultrasound pulse beam into a body to be examined.

The emitted ultrasound pulse beam is reflected at various places within the body. The reflection-resultant ultrasound pulse beams are ultrasound echo beams. Portions of the ultrasound echo beams return to the probe 111. The probe 111 converts the received portions of the ultrasound echo beams into a corresponding electric echo signal which is also referred to as an electric received signal. The probe 1 11 outputs the electric received signal to the receiving section 112.

In general, the ultrasound transmission by the probe 111 and the ultrasound reception by the probe 111 are alternately and periodically implemented on a time sharing basis.

Figure 5:
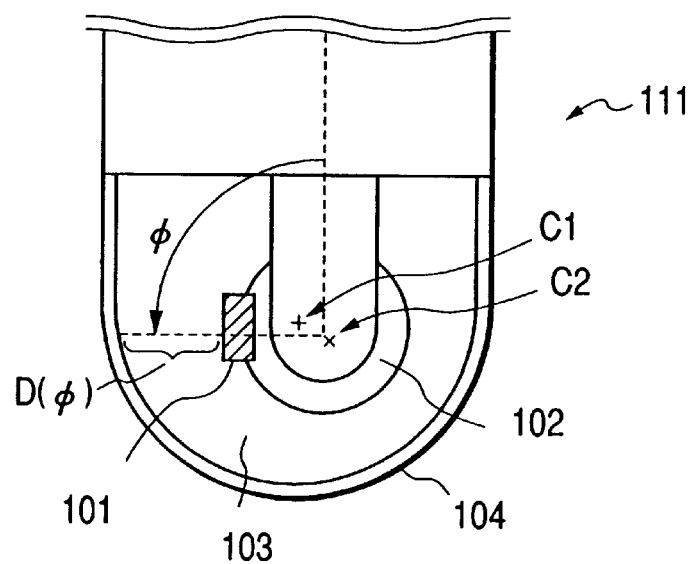
FIG. 5 is a sectional diagram of a probe in FIG. 4.

As shown in FIG. 5, the probe 111 includes a transducer 101 a rotor 102 ultrasound propagation medium or liquid 103 and an acoustic window 104. The probe 111 has a casing in which the transducer 101 the rotor 102 and the propagation liquid 103 are contained. The transducer 101 is mounted on the rotor 102. The rotor 102 is rotated by a motor (not shown) within the probe 111. The transducer 101 rotates in accordance with rotation of the rotor 102. The transducer 101 includes, for example, a piezoelectric element array. The acoustic window 104 forms a part of the casing. The combination of the transducer 101 and the rotor 102 is separated from the acoustic window 104. A space between the transducer 101 and the acoustic window 104 is filled with the propagation liquid 103. The acoustic window 104 is hemispherical. The center C1 of the hemisphere of the acoustic window 104 is offset from the center C2 of rotation of the rotor 102 that is, the center of rotation of the transducer 101. The transducer 101 in the probe 111 is electrically connected to the receiving section 112 and the transmitting section 118 (see FIG. 4). The motor for the rotor 102 is electrically connected to the motor controller 124 (see FIG. 4).

During the normal mode of operation of the system, the probe 111 is applied to a body to be examined. The transducer 101 receives the electric drive pulse signal from the transmitting section 118. The transducer 101 converts the electric drive pulse signal into a beam of corresponding ultrasound pulses. The transducer 101 emits the ultrasound pulse beam. The ultrasound pulse beam emitted from the transducer 101 passes through the propagation liquid 103 and the acoustic window 104 before entering the body to be examined. The emitted ultrasound pulse beam is reflected at various places within the body. The reflection-resultant ultrasound pulse beams are ultrasound echo beams. Portions of the ultrasound echo beams return to the transducer 101 via the acoustic window 104 and the propagation liquid 103. The transducer 101 converts the received portions of the ultrasound echo beams into a corresponding electric echo signal which is also referred to as an electric received signal. The transducer 101 outputs the electric received signal to the receiving section 112. As the rotor 102 rotates, the direction of the travel of the ultrasound pulse beam emitted from the transducer 101 moves so that the body is scanned by the ultrasound pulse beam. A given number of unit scanning processes by the transducer 101 provides a 1-frame sectional image of the body. The electric received signal generated for every unit scanning process is referred to as a 1-sound-line received signal or a 1-line received signal.

The receiving section 112 amplifies the electric received signal, and outputs the amplification-resultant received signal to the A/D converter 113. The A/D converter 113 changes the output signal of the receiving section 112 into a corresponding digital received signal. The A/D converter 113 outputs the digital received signal to the switch 125. The switch 125 transmits the digital received signal to either the memory 121 or the calculator 126. During the normal mode of operation of the system, the switch 125 transmits the digital received signal to the memory 121. The digital received signal is stored into the memory 121 line by line. A predetermined number of successive 1-line received signals are held in the memory 121. In the case where the memory 121 is fully occupied, each time the newest 1-line received signal is written into the memory 121 the oldest 1-line received signal is erased therefrom. The 1-line received signals are read out from the memory 121 before being transmitted to the calculator 120 via the delay section 123. The delay section 123 provides a variable delay to the 1-line received signals transmitted to the calculator 120. The calculator 120 computes a mean of the delayed 1-line received signals from the delay section 123 and thereby generates the resultant mean 1-line received signal. The calculator 120 outputs the mean 1-line received signal to the subtracter 114. One is selected from among the 1-line received signals in the memory 121 as a 1-line received signal of interest. Preferably, the 1-line received signal in the middle of the temporal order is selected. The 1-line received signal of interest is fed from the memory 121 to the subtracter 114. The device 114 subtracts the mean 1-line received signal from the 1-line received signal of interest. The subtracter 114 outputs the subtraction-resultant signal to the detector 115. The detector 115 subjects the output signal of the subtracter 114 to a detection process, and thereby converts the output signal of the subtracter 114 into a first video signal. The detector 115 outputs the first video signal to the scan converter 116. The scan converter 116 collects every 1-frame amount of the first video signal. For every 1-frame, the scan converter 116 subjects the first video signal to scan conversion, and thereby changes the first video signal into a second video signal having a scan format suited for indication on the monitor 117. The scan converter 116 outputs the second video signal to the monitor 117. The monitor 117 indicates a sectional image of the body which is represented by the output signal of the scan converter 116.

The preliminary mode of operation of the system is implemented immediately after the probe 111 is connected to a main body of the system or the probe 111 is replaced by a new one. The preliminary mode of operation of the system precedes the normal mode of operation thereof.

During the preliminary mode of operation of the system, the switch 125 connects the A/D converter 113 to the calculator 126. During the preliminary mode of operation, the system operates as follows. The transducer 101 the receiving section 112 the A/D converter 113 and the transmitting section 118 act similarly to their actions which occur during the normal mode of operation of the system. The calculator 126 receives the output signal of the A/D converter 113 via the switch 125. The calculator 126 computes the spatial interval D(φ) between the transducer 101 and the acoustic window 104 which varies as a function of the angular position φ of the rotor 102 (the angular position of the transducer 101). The offset relation between the center C1 of the hemisphere of the acoustic window 104 and the center C2 of rotation of the rotor 102 causes the dependency of the spatial interval D(φ) upon the angular position φ of the rotor 102. The calculator 126 generates information of the computed spatial interval D(φ). The calculator 126 stores the information of the computed spatial interval D(φ) into the memory 127.

In general, the calculator 126 is informed by the transmitting section 118 of the moment of the start of every unit scanning process (that is, the moment of the start of emission of ultrasound pulses from the transducer 101 in every unit scanning process). For every unit scanning process, the calculator 126 detects the moment at which an analog amplitude represented by the output signal of the A/D converter 113 exceeds a predetermined reference value for the first time. The calculator 126 computes the time interval T(φ) between the moment of the start of the unit scanning process and the previously-indicated detected moment. The calculator 126 computes the spatial interval D(φ) from the computed time interval T(φ) according to the following equation.

$$D(\phi)=T(\phi)\cdot C/2$$

where C denotes the velocity of sound in the propagation liquid 103.

The normal mode of operation of the system will be further explained below. During a 1-frame time interval except an initial stage, (2n+1) successive 1-line received signals are held in the memory 121. Here "n" denotes a predetermined natural number. In the probe 111 a portion of the ultrasound pulse beam tends to travel between transducer 101 and the acoustic window 104 while being periodically reflected at the surfaces thereof. Such a phenomenon causes undesired multiple echoes which would result in artifact in imaging. In each of the 1-line received signals in the memory 121 an undesired multiple-echo signal is superimposed on a desired echo signal caused by ultrasound reflections at places within the body.

Figure 6:
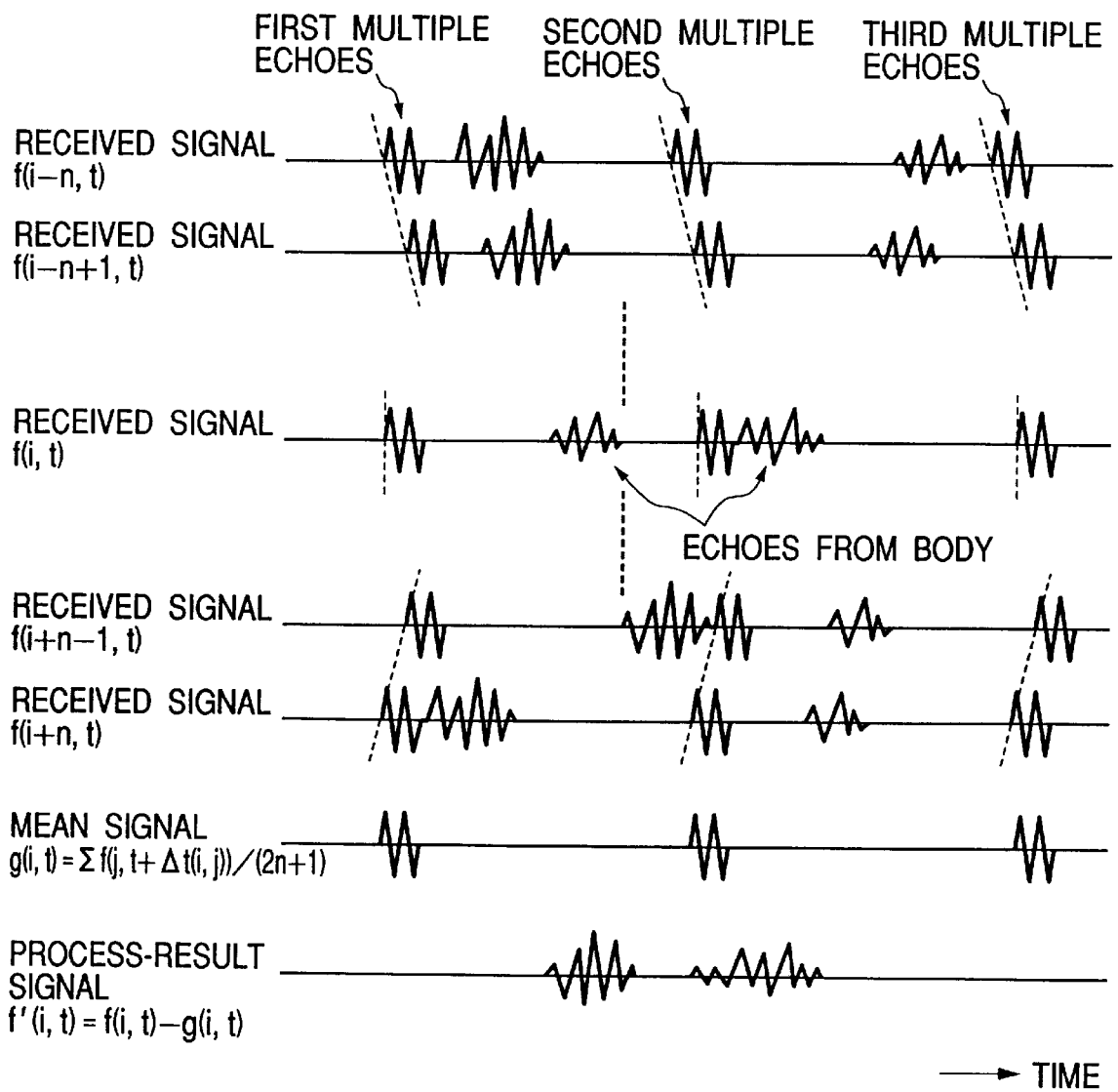
FIG. 6 is a time-domain diagram of waveforms represented by various signals which occur in the ultrasound imaging system of FIG. 4.

Now, the (2n+1) successive 1-line received signals in the memory 121 which occur at a moment "t" are denoted by f(i−n, t), f((i−n+1, t), . . . , f(i, t), . . . , f(i+n−1t), f(i+n, t), respectively. FIG. 6 shows an example of analog waveforms represented by the 1-line received signals f(i−n, t), f((i−n+1, t), . . . , f(i, t), . . . , f(i+n−1t), f(i+n, t). The 1-line received signals are transmitted from the memory 121 to the calculator 120 via the delay section 123.

The motor controller 124 controls rotation of the rotor 102 that is, rotation of the transducer 101. The motor controller 124 outputs a signal to the delay section 123 which represents the angular position φ of the rotor 102. The information of the spatial interval D(φ) is transmitted from the memory 127 to the delay section 123. The delay section 123 provides a delay Δt(j, i) to the 1-line received signals transmitted to the calculator 120. The delay Δt(j, i) provided by the delay section 123 is determined by the angular position φ of the rotor 102 and the spatial interval D(φ). The delay Δt(j, i) is chosen to equalize temporal positions of undesired multiple-echo components in the delay-resultant 1-line received signals. Preferably, the delay Δt(j, i) is given by the following equation.

$$\Delta t(j,\ i)=2\cdot m\cdot\{D(\phi(i))\}/C$$

where C denotes the velocity of sound in the propagation liquid 103 and "m" denotes the number of times of reflection related to undesired multiple-echo signal components to be removed. The number "m" is set to "1" when first multiple-echo signal components are to be removed. The number "m" is set to "2" when second multiple-echo signal components are to be removed. The number "m" is set to "k" when k-th multiple-echo signal components are to be removed.

The calculator 120 computes a mean of the delayed 1-line received signals from the delay section 123 and thereby generates the resultant mean 1-line received signal g(i, t) according to an equation as follows.

$$g(i,\ t)=\{\Sigma f(j,\ t+\Delta t(i,\ j))\}/(2n+1)$$

The calculator 120 outputs the mean 1-line received signal g(i, t) to the subtracter 114. The middle 1-line received signal f(i, t) is selected from among the 1-line received signals in the memory 121 as a 1-line received signal of interest. The 1-line received signal f(i, t) of interest is fed from the memory 121 to the subtracter 114. The device 114 subtracts the mean 1-line received signal g(i, t) from the 1-line received signal f(i, t) of interest. The subtracter 114 outputs the subtraction-resultant signal f(i, t) to the detector 115.

Undesired multiple-echo components appear at equal temporal positions in the 1-line received signals outputted from the delay section 123 to the calculator 120. On the other hand, temporal positions of desired echo components in the 1-line received signals vary from line to line. Therefore, the mean 1-line received signal g(i, t) generated by the calculator 120 substantially has only the undesired multiple-echo components. In addition, the subtraction-resultant signal f(i, t) generated by the subtracter 114 is substantially free from the undesired multiple-echo components. Thus, the subtraction-resultant signal f(i, t) substantially has only the desired echo components. In this way, the subtracter 114 removes the undesired multiple-echo components from the signal fed to the detector 115. The removal of the undesired multiple-echo components prevents the occurrence of artifact in imaging.

Third Embodiment

A third embodiment of this invention is similar to the second embodiment thereof except for design changes indicated hereinafter.

The spatial interval D(φ) computed in the second embodiment of this invention tends to vary with the angular position φ of the rotor 102 along an unsmooth curve A1 in FIG. 7 due to noise. The third embodiment of this invention uses a smooth function A2 in FIG. 7 which is approximate to the computed spatial interval D(φ).

A theoretical spatial interval Dth(φ) is expressed as follows.

$$Dth(\phi) = \{(Rw \cdot \cos\phi + \Delta r \cdot \cos\Delta\phi) \cdot (Rw \cdot \cos\phi + \Delta r \cdot \cos\Delta\phi) +$$
$$(Rw \cdot \sin\phi + \Delta r \cdot \sin\Delta\phi) \cdot (Rw \cdot \sin\phi + \Delta r \cdot \sin\Delta\phi)\}^{1/2} - Rr$$
$$= \{Rw^2 + 2Rw \cdot \Delta r \cdot \cos(\phi - \Delta\phi) + \Delta r^2\}^{1/2} - Rr$$

where Rw denotes the curvature radius of the acoustic window 104; Rr denotes the radius of rotation of the rotor 102; Δr denotes the offset distance between the center of the hemisphere of the acoustic window 104 and the center of rotation of the rotor 102; and Δφ denotes the direction of the offset distance. A spatial interval Dap(φ) approximate to the theoretical spatial interval Dth(φ) is expressed as follows.

$$Dap(\phi) = Rw - Rr + \Delta r \cos(\phi - \Delta\phi) \quad (1)$$

In the third embodiment of this invention, the calculator 126 operates as follows. The calculator 126 processes the output signal of the A/D converter 113 and thereby computes the offset distance Δr and the offset direction Δφ in a method of least squares while using the angular position φ of the rotor 102 as a variable. Then, the calculator 126 computes the approximate spatial interval Dap(φ) from the computed offset distance Δr and the computed offset direction Δφ according to the previously-indicated equation (1). Subsequently, the calculator 126 generates information of the computed approximate spatial interval Dap(φ). The calculator 126 stores the information of the approximate spatial interval Dap(φ) into the memory 127 instead of information of the computed spatial interval D(φ) provided in the second embodiment of this invention.

The method of least squares may be replaced by another method. The spatial interval Dap(φ) may be based on an n-order polynomial or another function different from the previously-indicated trigonometric function.

Fourth Embodiment

A fourth embodiment of this invention is similar to one of the first, second, and third embodiments thereof except for the following design change. The fourth embodiment of this invention includes an ultrasound probe of an electronic scan type rather than an ultrasound probe of a mechanical scan type. The fourth embodiment of this invention removes undesired components from an output signal of the electronic-scan probe which are caused by multiple echoes in the electronic-scan probe.

What is claimed is:

1. A method of reducing an undesired multiple-echo signal in ultrasound imaging, comprising the steps of:
   successively generating first 1-sound-line received signals from an output signal of a transducer;
   selecting one from among the generated first 1-sound-line received signals as a 1-sound-line received signal of interest;
   selecting second 1-sound-line received signals from among the generated first 1-sound-line received signals, the second 1-sound-line received signals including a 1-sound-line received signal preceding the 1-sound-line received signal of interest and also a 1-sound-line received signal following the 1-sound-line received signal of interest;
   averaging the second 1-sound-line received signals into a mean 1-sound-line received signal which corresponds to an undesired multiple-echo signal;
   subtracting the mean 1-sound-line received signal from the 1-sound-line received signal of interest to remove the undesired multiple-echo signal from the 1-sound-line received signal of interest.

2. A method as recited in claim 1, further comprising the step of using a probe of a mechanical scan type in which the transducer is provided.

3. A method of reducing an undesired multiple-echo signal in ultrasound imaging, comprising the steps of:
   generating information of a distance between a movable transducer and an acoustic window in a probe, the distance depending on a position of the transducer;
   successively generating first 1-sound-line received signals from an output signal of the transducer;
   selecting one from among the generated first 1-sound-line received signals as a 1-sound-line received signal of interest;
   selecting second 1-sound-line received signals from among the generated first 1-sound-line received signals, the second 1-sound-line received signals including a 1-sound-line received signal preceding the 1-sound-line received signal of interest and also a 1-sound-line received signal following the 1-sound-line received signal of interest;
   delaying the second 1-sound-line received signals into third 1-sound-line received signals in response to the information of the distance;
   averaging the third 1-sound-line received signals into a mean 1-sound-line received signal which corresponds to an undesired multiple-echo signal;
   subtracting the mean 1-sound-line received signal from the 1-sound-line received signal of interest to remove the undesired multiple-echo signal from the 1-sound-line received signal of interest.

4. A method as recited in claim 3, wherein the delaying step comprises delaying the second 1-sound-line received signals by amounts depending on a number of times of ultrasound reflections which cause an undesired multiple-echo signal to be removed.

5. An apparatus for reducing an undesired multiple-echo signal in ultrasound imaging, comprising:
   a transducer;
   means for successively generating first 1-sound-line received signals from an output signal of the transducer;
   means for selecting one from among the generated first 1-sound-line received signals as a 1-sound-line received signal of interest;
   means for selecting second 1-sound-line received signals from among the generated first 1-sound-line received signals, the second 1-sound-line received signals including a 1-sound-line received signal preceding the 1-sound-line received signal of interest and also a 1-sound-line received signal following the 1-sound-line received signal of interest;
   means for averaging the second 1-sound-line received signals into a mean 1-sound-line received signal which corresponds to an undesired multiple-echo signal;
   means for subtracting the mean 1-sound-line received signal from the 1-sound-line received signal of interest to remove the undesired multiple-echo signal from the 1-sound-line received signal of interest.

6. An apparatus as recited in claim 5, further comprising a probe of a mechanical scan type in which the transducer is provided.

7. An apparatus for reducing an undesired multiple-echo signal in ultrasound imaging, comprising:

a probe including a movable transducer and an acoustic window;

means for generating information of a distance between the transducer and the acoustic window, the distance depending on a position of the transducer;

means for successively generating first 1-sound-line received signals from an output signal of the transducer;

means for selecting one from among the generated first 1-sound-line received signals as a 1-sound-line received signal of interest;

means for selecting second 1-sound-line received signals from among the generated first 1-sound-line received signals, the second 1-sound-line received signals including a 1-sound-line received signal preceding the 1-sound-line received signal of interest and also a 1-sound-line received signal following the 1-sound-line received signal of interest;

means for delaying the second 1-sound-line received signals into third 1-sound-line received signals in response to the information of the distance;

means for averaging the third 1-sound-line received signals into a mean 1-sound-line received signal which corresponds to an undesired multiple-echo signal;

means for subtracting the mean 1-sound-line received signal from the 1-sound-line received signal of interest to remove the undesired multiple-echo signal from the 1-sound-line received signal of interest.

8. An apparatus as recited in claim 7, wherein the delaying means comprises means for delaying the second 1-sound-line received signals by amounts depending on a number of times of ultrasound reflections which cause an undesired multiple-echo signal to be removed.

9. An apparatus as recited in claim 7, wherein the information generating means comprises means for generating the information of the distance in response to a portion of the output signal of the transducer which represents a first reflected wave caused by and coming from the acoustic window.

10. An apparatus as recited in claim 7, wherein the information generating means comprises means for detecting every moment at which an amplitude of the output signal of the transducer exceeds a predetermined reference value, and means for generating the information of the distance in response to the detected moment.

11. An apparatus as recited in claim 7, wherein the information generating means comprises means for generating the information of the distance according to an approximate trigonometric function.

* * * * *